(12) United States Patent
Shikano et al.

(10) Patent No.: US 7,428,454 B2
(45) Date of Patent: Sep. 23, 2008

(54) ELECTRONIC CONTROL SYSTEM BUILT INTO VEHICLE

(75) Inventors: Toshiya Shikano, Utsunomiya (JP); Tatsuya Kyomitsu, Oyama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 11/148,732

(22) Filed: Jun. 9, 2005

(65) Prior Publication Data
US 2005/0278083 A1    Dec. 15, 2005

(30) Foreign Application Priority Data
Jun. 14, 2004    (JP) ............................. 2004-175665

(51) Int. Cl.
*G06F 19/00* (2006.01)
(52) U.S. Cl. .................... 701/36; 715/750; 704/275
(58) Field of Classification Search .............. None
See application file for complete search history.

(56) References Cited

U.S. PATENT DOCUMENTS

| | | | | |
|---|---|---|---|---|
| 6,029,110 | A * | 2/2000 | Zuber et al. ................. | 701/200 |
| 6,256,558 | B1 | 7/2001 | Sugiura et al. | |
| 6,539,289 | B2 * | 3/2003 | Ogino et al. .................... | 701/1 |
| 6,961,644 | B2 * | 11/2005 | Mercier et al. ................. | 701/36 |
| 2004/0090525 | A1 * | 5/2004 | Eichmann .................... | 348/148 |
| 2005/0049864 | A1 * | 3/2005 | Kaltenmeier et al. ........ | 704/233 |
| 2006/0155429 | A1 * | 7/2006 | Boone et al. .................... | 701/1 |

FOREIGN PATENT DOCUMENTS

| | | |
|---|---|---|
| EP | 0472356 A1 * | 2/1992 |
| JP | 11-065587 | 3/1999 |
| JP | 11-198745 | 7/1999 |
| JP | 2000-346651 | 12/2000 |
| JP | 2001-013994 | 1/2001 |
| JP | 2001-095082 | 4/2001 |
| JP | 2002-169584 | 6/2002 |
| JP | 2002-243488 | 8/2002 |
| JP | 2003-019927 | 1/2003 |
| JP | 2003-114699 | 4/2003 |
| JP | 2003-231427 | 8/2003 |
| JP | 2004-009834 | 1/2004 |
| WO | WO 01/41499 | 6/2001 |

* cited by examiner

*Primary Examiner*—Michael J. Zanelli
(74) *Attorney, Agent, or Firm*—Carrier, Blackman & Associates, P.C.; Joseph P. Carrier; William D. Blackman

(57) ABSTRACT

An on-vehicle electronic control system has an input device for performing a plurality of manual input operations, wherein the input operations can be simultaneously and independently input; a processing device for independently processing the input operations and outputting respective processed results corresponding to the input operations; and a display device for independently showing the respective processed results. The display device may have a single display screen which is divided into a plurality of display sections for independently and simultaneously showing the respective processed results. The input device may have a microphone array including a plurality of microphones so as to simultaneously and independently perform a plurality of voice input operations. Typically, the input device assigns a task to any one of the input operations; and the processing device has a task content changing device for making the task be inherited and executed as a task assigned to another input operation.

20 Claims, 13 Drawing Sheets

FIG. 2

Enter city name;
LOS ANGELES,CA

| 1 | 2 | 3 | 4 | 5 | 6 | 7 | 8 | 9 | 0 |
| A | B | C | D | E | F | G | H | I | J |
| K | L | M | N | O | P | Q | R | S | T |
| U | V | W | X | Y | Z | & | · | / | ' |

Delete | Space | List

Choose a category;

Auto Service | Leisure
Banking | Restaurant
Community | Shopping
Emergency | Travel
Hotel/Motel | Advanced

Enter city name;
LOS ANGELES,CA

| 1 | 2 | 3 | 4 | 5 | 6 | 7 | 8 | 9 | 0 |
| A | B | C | D | E | F | G | H | I | J |
| K | L | M | N | O | P | Q | R | S | T |
| U | V | W | X | Y | Z | & | • | / | ' |

Delete  Space  List

The contents to be inherited have been stored.

Banking  Restaurant
Community  Shopping
Emergency  Travel
Hotel/Motel  Advanced

ELECTRONIC CONTROL SYSTEM BUILT INTO VEHICLE

CROSS-REFERENCE TO RELATED APPLICATIONS

The present invention claims priority under 35 USC 119 based on Japanese patent application No. 2004-175665, filed on Jun. 14, 2004. The subject matter of this priority document is incorporated by reference herein.

1. Field of the Invention

The present invention relates to vehicle surroundings monitoring apparatus which extracts an object by binarizing an infrared image.

2. Description of Related Art

There are conventional on-vehicle electronic control systems for processing external input operations or tasks assigned to the input operations, for example, on-vehicle navigation systems, and voice recognition devices or display devices used for the navigation systems.

More specifically, a representative example of the on-vehicle navigation systems has a front seat operating device for front seats and a back seat operating device for back seats, and when an operation is input from the back seat operating device while the vehicle is running, the display device shows two divided screens, one being a navigation screen and the other being an operation screen relating to the operation input by the back seat operating device. Accordingly, the navigation screen necessary to the driver on the front seat of the running vehicle and the operation screen for an occupant who does not participate in the vehicle driving operation and can freely perform input operations are simultaneously displayed, thereby providing data necessary to each occupant (see Japanese Unexamined Patent Application, First Publication No. 2003-231427).

A representative example of the voice recognition devices has a microphone array consisting of a plurality of microphones, and directivity characteristics of the microphone array are used for separating a plurality of input voices from each other, so as to extract only a required voice. Accordingly, when the voice recognition device is used in the vehicle's interior, it is possible to distinguishably process speech of occupants in the driver's and the front passenger's seats (see Japanese Unexamined Patent Application, First Publication No. 2003-114699).

A representative example of the display device has (i) a display provided between the driver's seat and the front passenger's seat at approximately the same distance from both seats, and (ii) an operating device for an occupant in the driver's seat and an operating device for an occupant in the front passenger's seat. When the operating device for the occupant in the driver's seat is operated, an operation guidance display is shown on the driver's seat side in the display screen, and when the operating device for the occupant in the front passenger's seat is operated, the operation guidance display is shown on the front passenger's seat side in the display screen. Accordingly, for both occupants in the driver's and the front passenger's seats, it is possible to improve visibility of the operation guidance display and also improve convenience of operations (see Japanese Unexamined Patent Application, First Publication No. 2003-019927).

In such conventional systems or devices, tasks assigned to a plurality of input operations, inputting operations themselves, or display operations cannot be processed in parallel, and, for example, one of two tasks or operations is selectively processed. Therefore, independent control operations which do not relate to each other cannot be simultaneously performed, and users are inconvenienced. More specifically, it is a common situation that occupants in the driver's and the front passenger's seats independently search for destinations from different points of view so as to finally determine the destination. However, in the conventional systems or devices, different destinations cannot be input simultaneously; thus, the occupants in the driver's and the front passenger's seats cannot simultaneously search for different destinations. In such a case, the occupants in the driver's and the front passenger's seats are inconvenienced.

In addition, the conventional systems or devices have a certain level of tolerance for noise. However, in the conventional systems or devices, the voice of an occupant in the driver's seat and the voice of an occupant in the front passenger's seat belong to the same frequency band; thus, for example, the voice of the occupant in the driver's seat can be recognized only when the occupant in the front passenger's seat does not speak. Here, when there is a plurality of occupants in the vehicle, it is natural that the occupants have conversations, and when the conversation is interrupted, the timing of the next speech of the occupant in the front passenger's seat cannot be predicted. Therefore, it is difficult for the system or device itself to detect the timing of when the voice operation is performed.

SUMMARY OF THE INVENTION

In view of the above circumstances, an object of the present invention is to provide an electronic control system built into a vehicle, which can independently process a plurality of input operations, where various outputs obtained by processing the input operations can be effectively used.

Therefore, the present invention provides an electronic control system built into a vehicle (i.e., an on-vehicle electronic control system), the system comprising: an input device (e.g., an input device 2 in an embodiment explained later) for performing a plurality of manual input operations, wherein the input operations can be simultaneously and independently input by an occupant of a driver's seat and an occupant of a passenger's seat; a processing device (e.g., a processing device 1 in the embodiment) for independently processing the input operations and outputting respective processed results corresponding to the input operations; and a display device (e.g., a display device 3 in the embodiment) for independently showing the respective processed results.

According to the electronic control system having the above structure, the manual input operations input by the input device are independently processed by the processing device, and the respective processed results are independently shown by the display device. Therefore, a plurality of manual input operations can be simultaneously processed, and respective processed results can be simultaneously shown. Accordingly, a plurality of users do not have to wait for their turn for input operations, and can freely perform input operations. In addition, a plurality of tasks can be simultaneously handled; thus, for example, results for input under different conditions can be easily compared with each other. Therefore, output of the on-vehicle electronic control system can be effectively used.

The display device may have a single display screen which is divided into a plurality of display sections for independently showing the respective processed results. Accordingly, even a single display device can independently show the respective processed results. Therefore, a plurality of display devices are unnecessary, thereby reducing the number of necessary parts and thus reducing the cost relating to the parts and the manufacturing cost. In addition, the display screen divided into a plurality of display sections is used; thus, if a touch panel is used as the input device, respective input operations can be performed on the single touch panel. Accordingly, the input device can be flexibly selected.

In a typical example, the input operations, are mechanically performed. In this case, a plurality of users can independently and simultaneously perform mechanical input operations. Accordingly, the users can perform input operations without interfering with each other.

Preferably, the input device has a microphone array (e.g., a microphone array 24 in the embodiment) including a plurality of microphones (e.g., microphones 24a, 24b, 24c, and 24d in the embodiment) so as to simultaneously and independently perform a plurality of voice input operations. Accordingly, the input device having the microphone array for independently and simultaneously performing voice input operations allows a plurality of users to simultaneously perform the voice input operations by using a single input device. Therefore, the users can perform input operations without interfering with each other. In addition, simultaneous input operations by using a single input device result in reduction in the number of necessary parts and also reduction in the cost relating to the parts and the manufacturing cost.

It is possible that:
the input device assigns a task to any one of the input operations; and
the input device has a task content changing device (e.g., a task content changing device 13 in the embodiment) for permitting the task to be inherited and executed as a task assigned to another input operation.

According to the electronic control system having the above structure, the manual input operations input by the input device are independently processed by the processing device, and the respective processed results are independently shown by the display device. Therefore, a plurality of manual input operations can be simultaneously processed and respective processed results can be simultaneously shown. Accordingly, a plurality of users do not have to wait for their turn for input operations, and can freely perform input operations. In addition, a plurality of tasks can be simultaneously handled; thus, for example, results for input under different conditions can be easily compared with each other. Therefore, output of the on-vehicle electronic control system can be effectively used.

The electronic control system may further comprise a voice output device (e.g., a voice output device 4 in the embodiment) for subjecting the respective processed results to different processes in accordance with the independent input operations, so as to independently and vocally output the processed results. According to the different processes in accordance with the independent input operations, the respective processed results can be distinguishably supplied to the users who performed the input operations. Therefore, even when a plurality of users simultaneously performs input operations, it is possible to prevent each user from hearing the relevant processed results incorrectly, thereby allowing each user to appropriately continue the input operation and improving operational convenience for the users.

In a preferable example, the voice output device independently outputs the different processed results by using voices having correspondingly different tone qualities or different volumes. Accordingly, it is possible to distinguishably output voices corresponding to the respective results toward the users who performed the input operations. Therefore, it is possible to allow each user to intuitively distinguish the relevant output voice and to reliably prevent each user from incorrectly hearing the relevant processed result.

In another preferable example, the voice output device has a speaker array (e.g., a voice output section 42 in the embodiment) including a plurality of speakers, and applies directivity to each processed result in accordance with the corresponding input operation by using the speaker array so as to output the processed results as voices having respective directivities. Therefore, directivities of the output voices corresponding to the respective processed results are different from each other, and each output voice is targeted only toward the relevant user. Accordingly, voices corresponding to the respective processed results can be distinguishably output toward the users who performed the relevant input operations, and it is possible to allow each user to hear only a voice necessary for the user and to reliably prevent each user from hearing the relevant processed result incorrectly.

BRIEF DESCRIPTION OF THE DRAWINGS

FIG. 2 is a diagram of the display screen of the display device of the on-vehicle electronic control system in the embodiment showing an example wherein the display is divided into two input portions.

FIG. 7 is a diagram showing an example of the display screen of the display device of the on-vehicle electronic control system in the embodiment in which the hand over operation button is presented.

FIG. 11 is a diagram showing another example of the display screen of the display device showing a message indicating that the contents of the requested task have been stored.

DETAILED DESCRIPTION OF THE INVENTION

Hereinafter, embodiments according to the present invention will be explained with reference to the drawings.

General Structure

Figure 1:
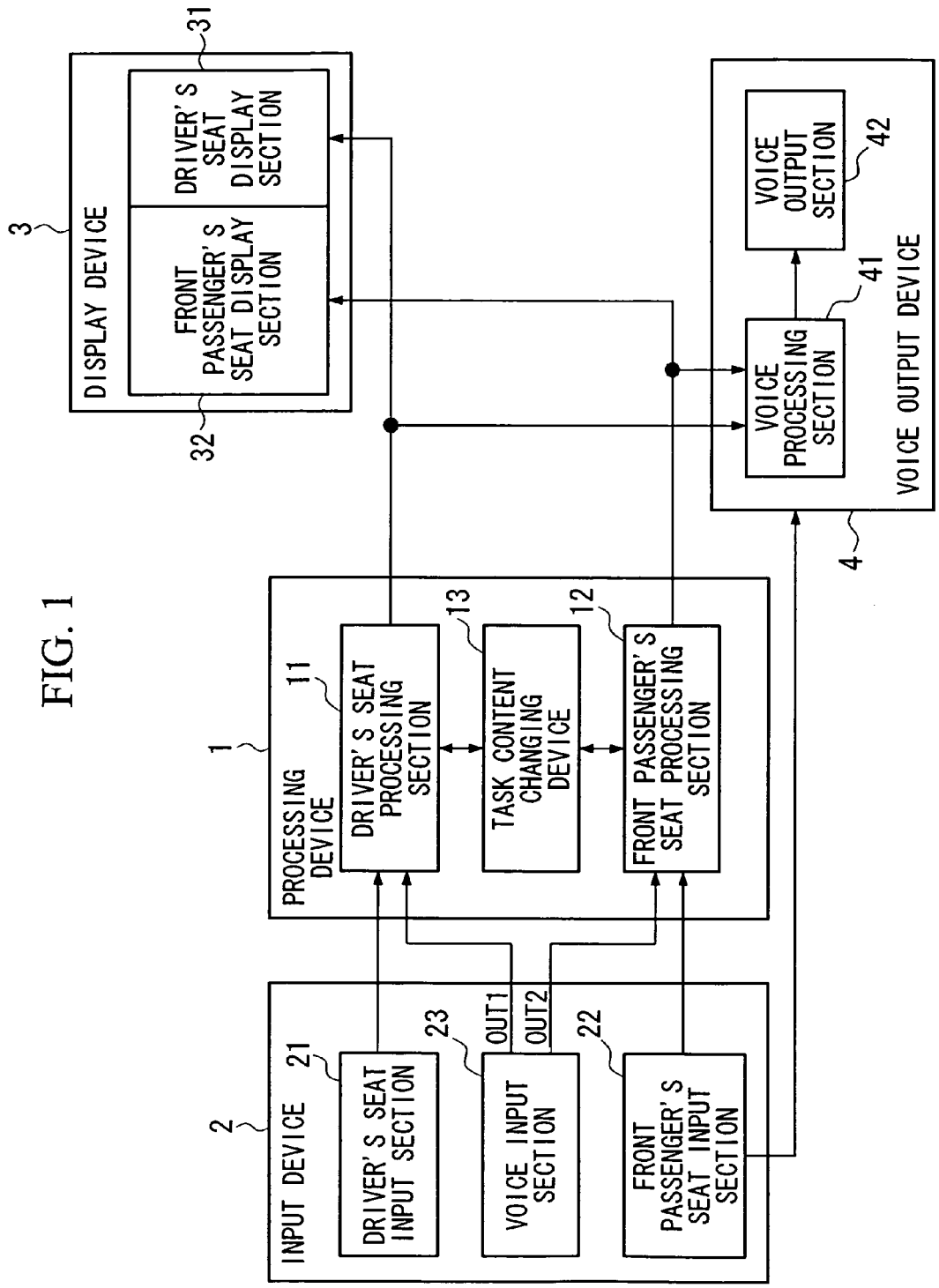
FIG. 1 is a block diagram showing the structure of an on-vehicle electronic control system as an embodiment according to the present invention.

FIG. 1 is a block diagram showing the structure of an electronic control system built into a vehicle (i.e., an on-vehicle electronic control system) as an embodiment of the present invention. This on-vehicle electronic control system, built into a vehicle, is effectively used for independently processing different operations which are respectively input by a plurality of occupants of the vehicle. For convenience of explanations, the present embodiment is for a case in which independent operations input by two occupants, a driver in the driver's seat and a passenger the front passenger's seat, are processed.

In FIG. 1, reference numeral 1 indicates a processing device for processing input operations input into the on-vehicle electronic control system. The following devices are connected to the processing device 1: (i) an input device 2, operated by occupants of the vehicle, for performing input operations, (ii) a display device 3 for showing any input operation performed by an occupant and also showing processed results (i.e., results of tasks produced and executed for the input operations) for the input operation on a display screen, and (iii) a voice output device 4 for vocally indicating any input operation and processed results for the input operation.

More specifically, the processing device 1 has (i) a driver's seat processing section 11 for processing input operations by an occupant in the driver's seat, (ii) a front passenger's seat processing section 12 for processing input operations by an occupant in the front passenger's seat, and (iii) a task content changing device 13 for making a task, which is executed for any one of the input operations, be handed over and executed as a task for another input operation. For example, a task executed by the driver's seat processing section 11 may be handed over and the corresponding task may be executed by the front passenger's seat processing section 12, or conversely, a task executed by the front passenger's seat processing section 12 may be handed over and the corresponding task may be executed by the driver's seat processing section 11. In the processing device 1, the driver's seat processing section 11 and the front passenger's seat processing section 12 independently execute respective processes. The operation of the processing device 1 will be explained later in detail.

The input device 2 has (i) a driver's seat input section 21 by which an occupant in the driver's seat can perform mechanical input operations, (ii) a front passenger's seat input section 22 by which an occupant in the front passenger's seat can perform mechanical input operations, and (iii) a voice input section 23 which obtains voices of the occupants in the driver's seat and the front passenger's seat, where independent voice input operation by each occupant is possible.

More specifically, the driver's seat input section 21 and the front passenger's seat input section 22 are input devices such as touch panels provided on the screen of the display device 3, or manually-operated input devices which have switches and are provided on an instrumental panel or a center console of the vehicle.

FIG. 2 is a diagram showing an example of the display screen of the display device 3 when the driver's seat input section 21 and the front passenger's seat input section 22 are touch panels provided on the screen of the display device 3. In FIG. 2, the touch panel is divided into two portions respectively assigned to the driver's seat input section 21 and the front passenger's seat input section 22. When the input sections 21 and 22 are input devices provided on an instrumental panel or a center console, the input devices are respectively positioned in the vicinities of the driver's seat and the front passenger's seat, so as to be easily operated by each occupant. In the input device 2, the driver's seat input section 21 and the front passenger's seat input section 22 can simultaneously and independently detect and obtain input operations. In addition, the driver's seat input section 21 communicates the input operation to the driver's seat processing section 11, and the front passenger's seat input section 22 communicates the input operation to the front passenger's seat processing section 12.

Figure 3:
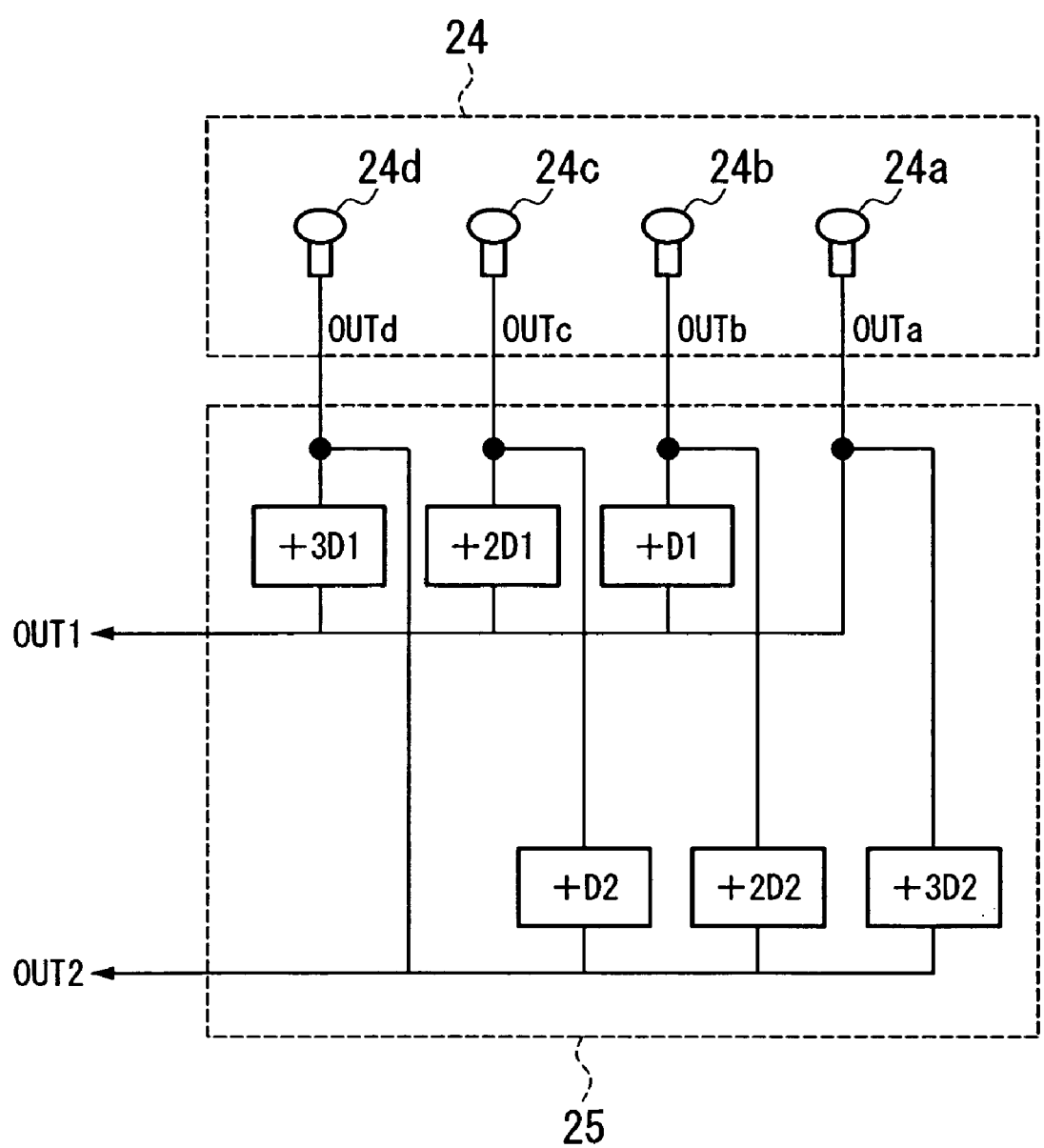
FIG. 3 is a diagram showing the structure of the voice input section of the on-vehicle electronic control system in the embodiment.
Figure 4A:
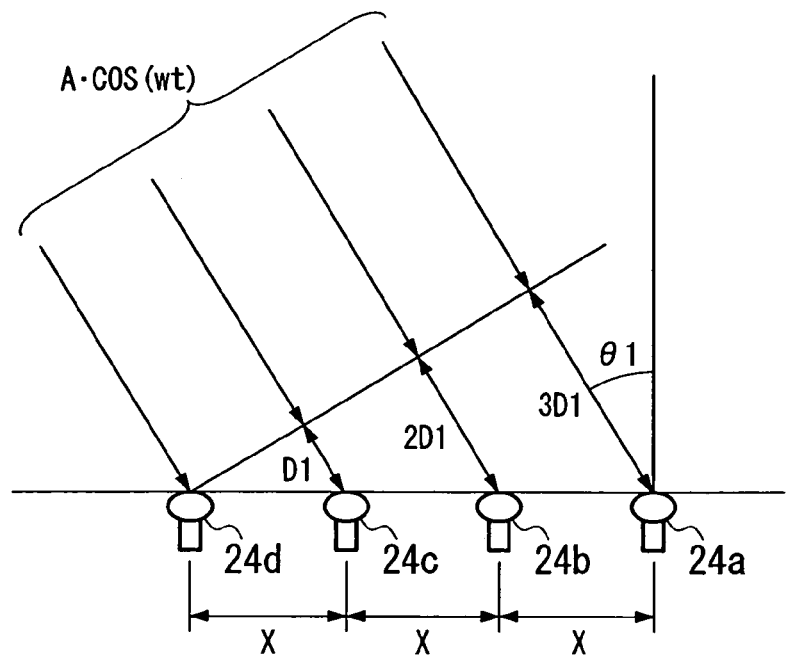
FIG. 4A is a diagram for explaining the principle for distinguishably obtaining different voices of occupants in the driver's seat and the front passenger's seat in the on-vehicle electronic control system in the embodiment showing the directionality associated with the occupant in the driver's seat.
Figure 4B:
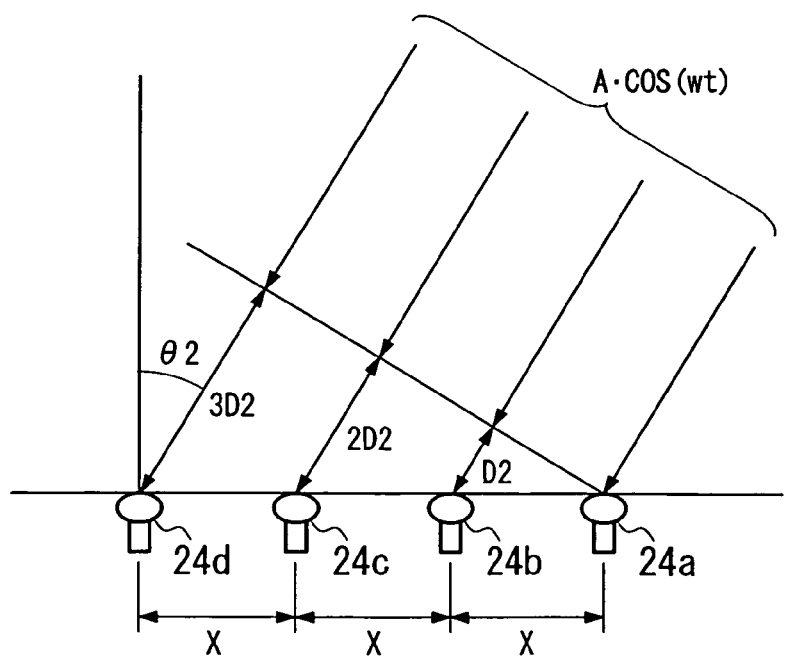
FIG. 4B is a diagram for explaining the principle for distinguishably obtaining different voices of occupants in the driver's seat and the front passenger's seat in the on-vehicle electronic control system in the embodiment showing the directionality associated with the occupant in the passenger's seat.

FIG. 3 is a diagram showing the structure of the voice input section 23. FIGS. 4A and 4B are diagrams for explaining the principle for distinguishably obtaining different voices of occupants in the driver's seat and the front passenger's seat. With reference to these figures, specific structure and operation for making voice input operations from both occupants in the driver's and the front passenger's seats possible will be explained below. First, the structure of the voice input section 23 will be explained.

As shown in FIG. 3, the voice input section 23 has a microphone array 24 consisting of a plurality of microphones, and an array processor 25 for processing voice signals output from the microphone array 24. The microphone array 24 may have four microphones 24a, 24b, 24c, and 24d which are arranged at regular intervals. The array processor 25 has delay circuits for simultaneously and distinguishably obtaining voices of occupants in the driver's and the front passenger's seats.

The operation for simultaneously and distinguishably obtaining voices of occupants in the driver's and the front passenger's seats will be explained. In a typical example, the microphone array 24 is mounted at a front portion in a center area between the occupants in the driver's and the front passenger's seats (i.e., in the vicinity of the center of the instrumental panel of the vehicle) while orienting the microphones toward the occupants. When the driver's seat is on the vehicle's right side and the microphones are oriented toward the center position between the occupants, the voice of the occupant in the driver's seat is input to the microphones at a relative angle θ1 from the left side in FIG. 4A. In this process, the longer the distance between the microphone and the driver's seat, the later the voice reaches the microphone. Therefore, the voice of the occupant in the driver's seat is input to four microphones 24a, 24b, 24c, and 24d with respective delays 3D1, 2D1, D1, and 0 (which are illustrated in FIG. 4A by double-headed arrows), in comparison with the input to the microphone 24d. That is, delay for the microphone 24a is three times as much as delay for the microphone 24c. Here, delay D1 is computed by the following formula (1), wherein X indicates the interval between the microphones.

$$D1 = X \cdot \sin(\theta 1) \quad (1)$$

Therefore, when the voice input from the driver's seat into the four microphones 24a to 24d is defined by a formula $A \cdot \cos(\omega t)$ (see FIG. 4A), output signals OUTa, OUTb, OUTc, and OUTd, respectively output from the microphones 24a to 24d, are indicated by the following formulas (2) to (5).

$$OUTa = A \cdot \cos(\omega t + 3 \cdot D1/2\pi\omega) \quad (2)$$

$$\text{OUT}b = A \cdot \cos(\omega t + 2 \cdot D \frac{1}{2} \pi \omega) \quad (3)$$

$$\text{OUT}c = A \cdot \cos(\omega t + 1 \cdot D \frac{1}{2} \pi \omega) \quad (4)$$

$$\text{OUT}d = A \cdot \cos(\omega t) \quad (5)$$

Generally, in order to extract only sound from a desired sound source by using the microphone array 24, it is ideal that the sound source is present exactly in front of the microphone array 24 and sound from the sound source reaches the four microphones 24a to 24d with the same delay so that output signals from the four microphones 24a to 24d can be added in phase (i.e., "ωt" for all output signals). However, when the sound source is not positioned exactly in front of the microphone array 24, delay times of the output signals from the microphones 24a to 24d are synchronized with each other so as to add the signals to each other in phase.

In order to compensate for the delay times of the output signals (indicated by the above formulas (2) to (5)) from the microphones 24a to 24d, the output signal from the microphone 24d is delayed by 3D1 by way of a delay circuit (see "+3D 1" in FIG. 3) in correspondence to the output signal OUTa from the microphone 24a, which has the largest delay. Similarly, the output signal from the microphone 24c is delayed by 2D1 by way of a delay circuit (see "+2D1" in FIG. 3), and the output signal OUTb from the microphone 24b is delayed by D1 by way of a delay circuit (see "+D1" in FIG. 3). Accordingly, the voice input section 23 outputs from an output terminal OUT1 an output signal corresponding to the voice command of the occupant in the driver's seat.

On the other hand, when the front passenger's seat is on the vehicle's left side and the microphones are oriented toward the center position between the occupants, the voice of the occupant in the front passenger's seat is input to the microphones at a relative angle θ2 from the right side in FIG. 4B. In this process, the greater the distance between the microphone and the front passenger's seat, the later the voice reaches the microphone. Therefore, the voice of the occupant in the front passenger's seat is input to the four microphones 24a, 24b, 24c, and 24d with respective delays 0, D2, 2D2, and 3D2 (illustrated in FIG. 4B by double-headed arrows), in comparison with the input to the microphone 24a. Delay D2 is computed by the following formula (6), wherein X indicates the interval between the microphones.

$$D2 = X \cdot \sin(\theta 2) \quad (6)$$

Similar to the principle applied to the processing of the voice of the occupant in the driver's seat, in order to compensate for the delay times of the output signals from the microphones 24a to 24d, the output signal OUTa from the microphone 24a is delayed by 3D2 by way of a delay circuit (see "+3D2" in FIG. 3) in correspondence to the output signal OUTd from the microphone 24d, which has the largest delay. Similarly, the output signal OUTb from the microphone 24b is delayed by 2D2 by way of a delay circuit (see "+2D2" in FIG. 3), and the output signal OUTc from the microphone 24c is delayed by D2 by way of a delay circuit (see "D2" in FIG. 3). Accordingly, the voice input section 23 outputs from an output terminal OUT2 an output signal corresponding to the voice command of the occupant in the front passenger's seat. The above principle is also effective when voices from the driver's and the front passenger's seats are simultaneously input, so that simultaneous input of voices from the driver's and the front passenger's seats are possible.

As shown in FIGS. 1 and 2, the display device 3 has a single body including a driver's seat display section 31 and a front passenger's seat display section 32 which respectively correspond to the divided driver's seat input section 21 and front passenger's seat input section 22 of the touch panel. An input operation performed by the occupant in the driver's seat is processed by the driver's seat processing section 11 of the processing device 1, and the driver's seat display section 31 displays processed results. Similarly, an input operation performed by the occupant in the front passenger's seat is processed by the front passenger's seat processing section 12 of the processing device 1, and the front passenger's seat display section 32 displays processed results. Here, the driver's seat display section 31 and the front passenger's seat display section 32 independently and simultaneously display respective processed results.

The voice output device 4 has a voice processing section 41 and a voice output section 42. The voice processing section 41 receives (i) the processed result which is output from the driver's seat processing section 11 related to the input operation by the occupant in the driver's seat, and (ii) the processed result which is output from the front passenger's seat processing section 12 related to the input operation by the occupant in the front passenger's seat. The voice processing section 41 independently processes the respective processed results in accordance with each input operation and outputs respective voice outputs obtained by independent voice-synthesizing operations. The operation of the voice processing section 41 will be explained in detail later.

The voice output section 42 outputs the voice outputs from the voice processing section 41 toward the occupants in the driver's and the front passenger's seats. The voice output section 42 has a speaker array consisting of a plurality of speakers, and outputs voices while applying directivity to the voices according to a principle reverse to the principle used in the voice input section 23. Here, distances from the driver's seat as a focal point to the speakers arranged in an array form are different from each other. In order to output a voice toward the occupant in the driver's seat, delay times for the voice to reach the focal point, due to the different distances, are computed, and each computed delay is added to the voice output from a speaker to which the delay should be applied so that the phases from the voices output from the speaker array are equal in the vicinity of the head of the occupant in the driver's seat, thereby obtaining an amplified output voice. Similarly, in order to output a voice toward the occupant in the front passenger's seat, delay times for the voice to reach the front passenger's seat, due to different distances from the front passenger's seat to the arrayed speakers, are computed, and each computed delay is added to the voice output from a speaker to which the delay should be applied.

Below, operations of the present embodiment will be explained with reference to the drawings.

Independent Voice Feedback Process for Each Operator

Figure 5:
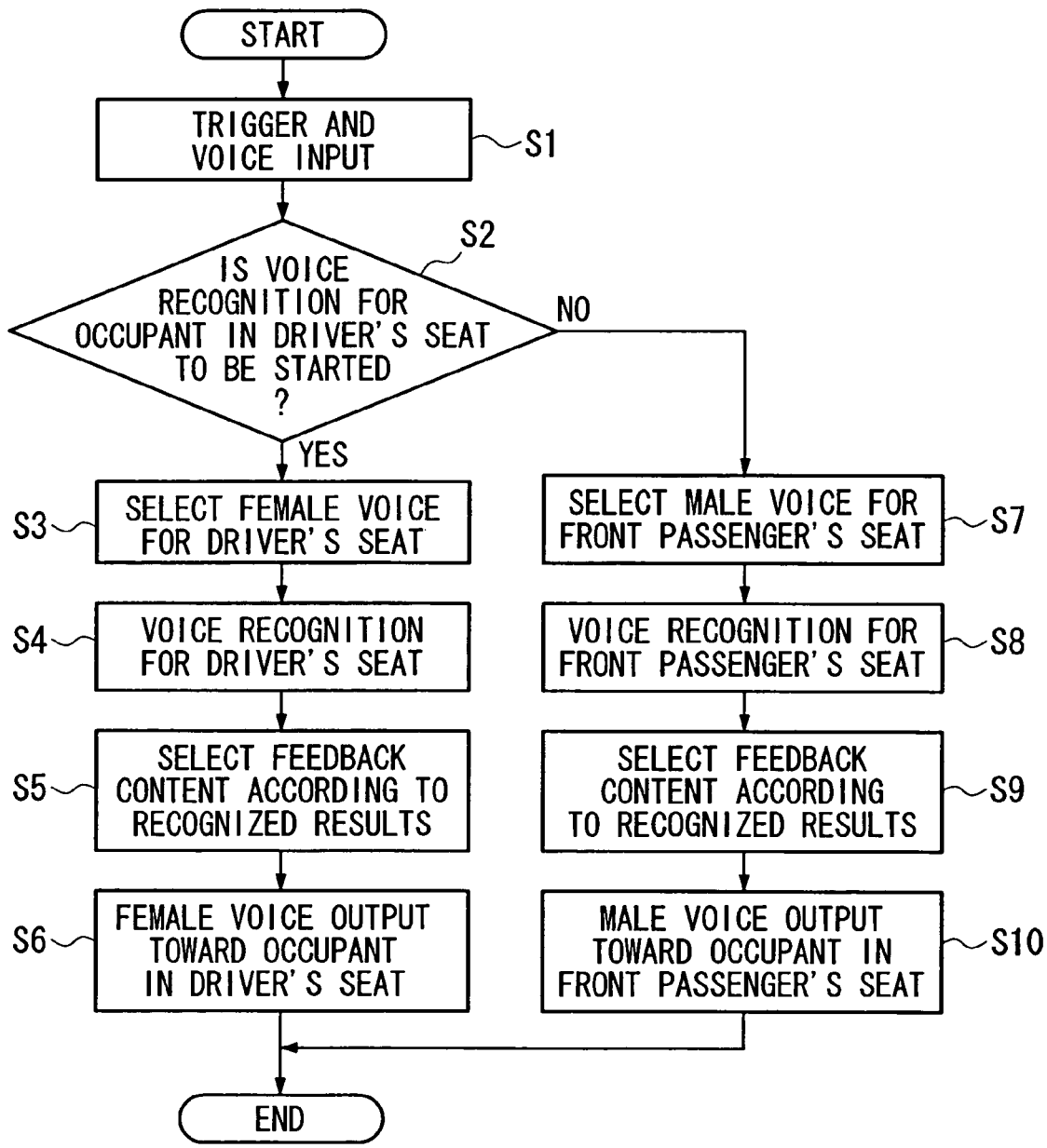
FIG. 5 is a flowchart showing the independent voice feedback process performed by the processing device and the voice output device of the on-vehicle electronic control system in the embodiment.

First, an independent voice feedback process performed by the processing device 1 and the voice output device 4 will be explained. This process is performed for independently processing a plurality of input operations and outputting respective voices corresponding to the independently processed results. FIG. 5 is a flowchart showing the independent voice feedback process.

First, when a talk switch button (not shown) is pushed (i.e., a trigger is input) and a voice command is issued from an occupant (see step S1), the processing device 1 determines whether the pushed talk switch button is for the driver's seat or the front passenger's seat, or whether a signal from the output terminal OUT 1 is input or a signal from the output terminal OUT2 is input, so as to determine whether a voice recognition process for the occupant in the driver's seat is to be started (see step S2).

If it is determined in step S2 that the pushed talk switch button is for the driver's seat, or that a signal from the output terminal OUT 1 is input, and thus the voice recognition process for the occupant in the driver's seat is to be started (i.e., "YES" in the determination), the voice processing section 41 of the voice output device 4 selects a kind of output voice (e.g., female voice) used in a voice synthesis process, so as to output a voice corresponding to the input operation from the occupant in the driver's seat (see step S3).

The processing device 1 executes the voice recognition process for the voice of the occupant in the driver's seat, by using the driver's seat processing section 11 (see step S4), and selects a feedback content to be output, based on the recognized results (see step S5).

The voice processing section 41 of the voice output device 4 performs a voice synthesis process using the selected female voice, and outputs the feedback content, selected by the processing device 1, in a female voice from the voice output section 42 of the voice output device 4 toward the occupant in the driver's seat (see step S6). The independent voice feedback process of the present flow is then completed.

Conversely, if it is determined in step S2 that the pushed talk switch button is for the front passenger's seat, or that a signal output from the output terminal OUT2 is input, and thus the voice recognition process for the occupant in the front passenger's seat is to be started (i.e., "NO" in the determination), then the voice processing section 41 of the voice output device 4 selects another kind of output voice (e.g., male voice) used in a voice synthesis process, so as to output a voice corresponding to the input operation from the occupant in the front passenger's seat (see step S7).

The processing device 1 executes the voice recognition process for the voice of the occupant in the front passenger's seat, by using the front passenger's seat processing section 12 (see step S8), and selects a feedback content to be output, based on the recognized results (see step S9).

The voice processing section 41 of the voice output device 4 performs a voice synthesis process using the selected male voice, and outputs the feedback content, selected by the processing device 1, in a male voice from the voice output section 42 of the voice output device 4 toward the occupant in the front passenger's seat (see step S10). The independent voice feedback process of the present flow is then completed.

Task Handover Process Between Operators

Below, the task handover process between the operators will be explained, which is performed for handing over a task assigned to any one of a plurality of input operations and executing it as a task assigned to another input operation. For convenience of explanation, it is assumed that the occupant in the driver's seat starts driving the vehicle while performing an input operation, and thus the driver cannot continue the input operation. In such a case, the task assigned to the relevant input operation is handed over from the driver's seat processing section 11 by way of the task content changing device 13 to the front passenger's seat processing section 12.

Operation of the Driver's Seat Processing Section

Figure 6:
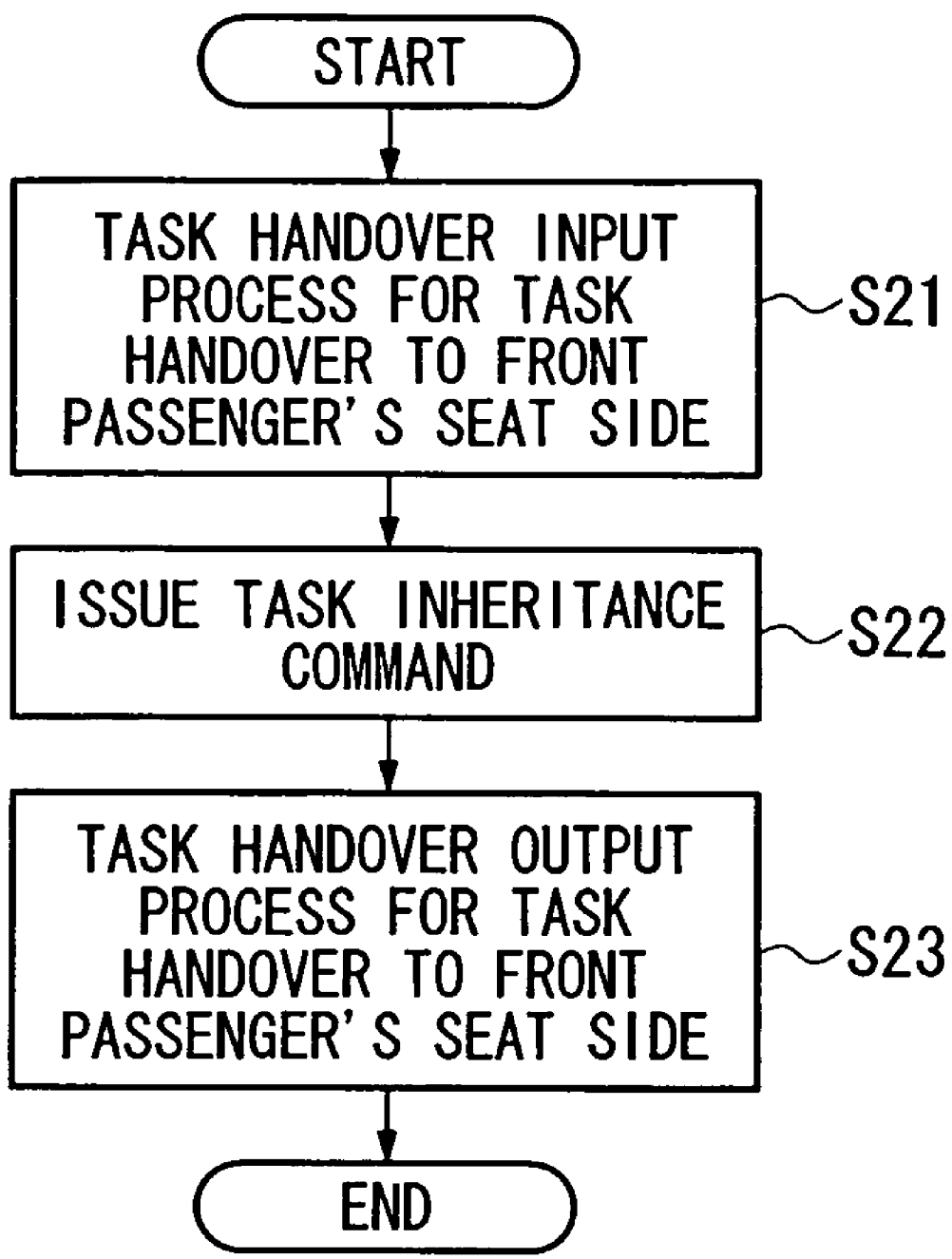
FIG. 6 is a flowchart of the task handover process performed by the driver's seat processing section in the processing device of the on-vehicle electronic control system in the embodiment.
Figure 7:
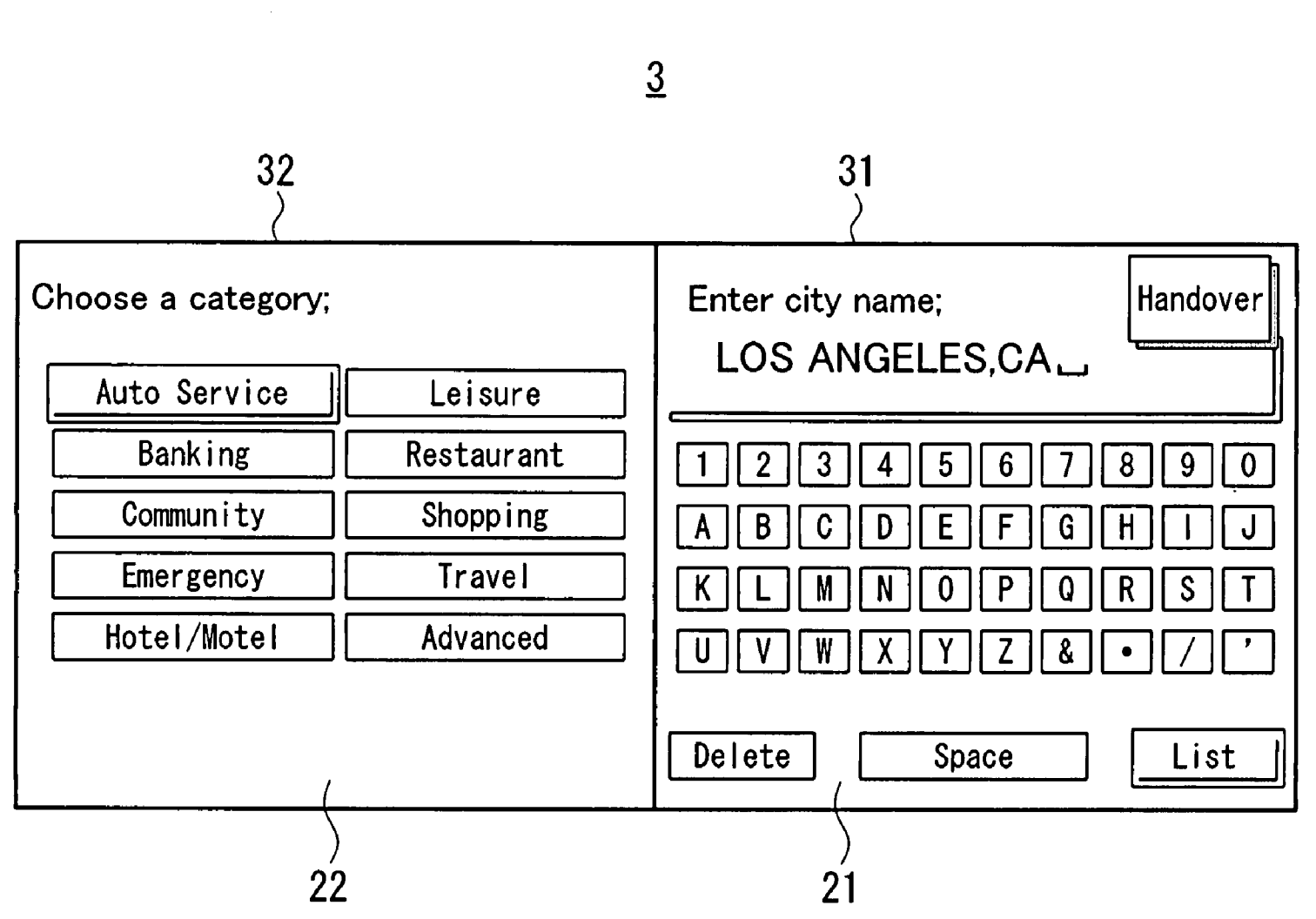
Figure 8:
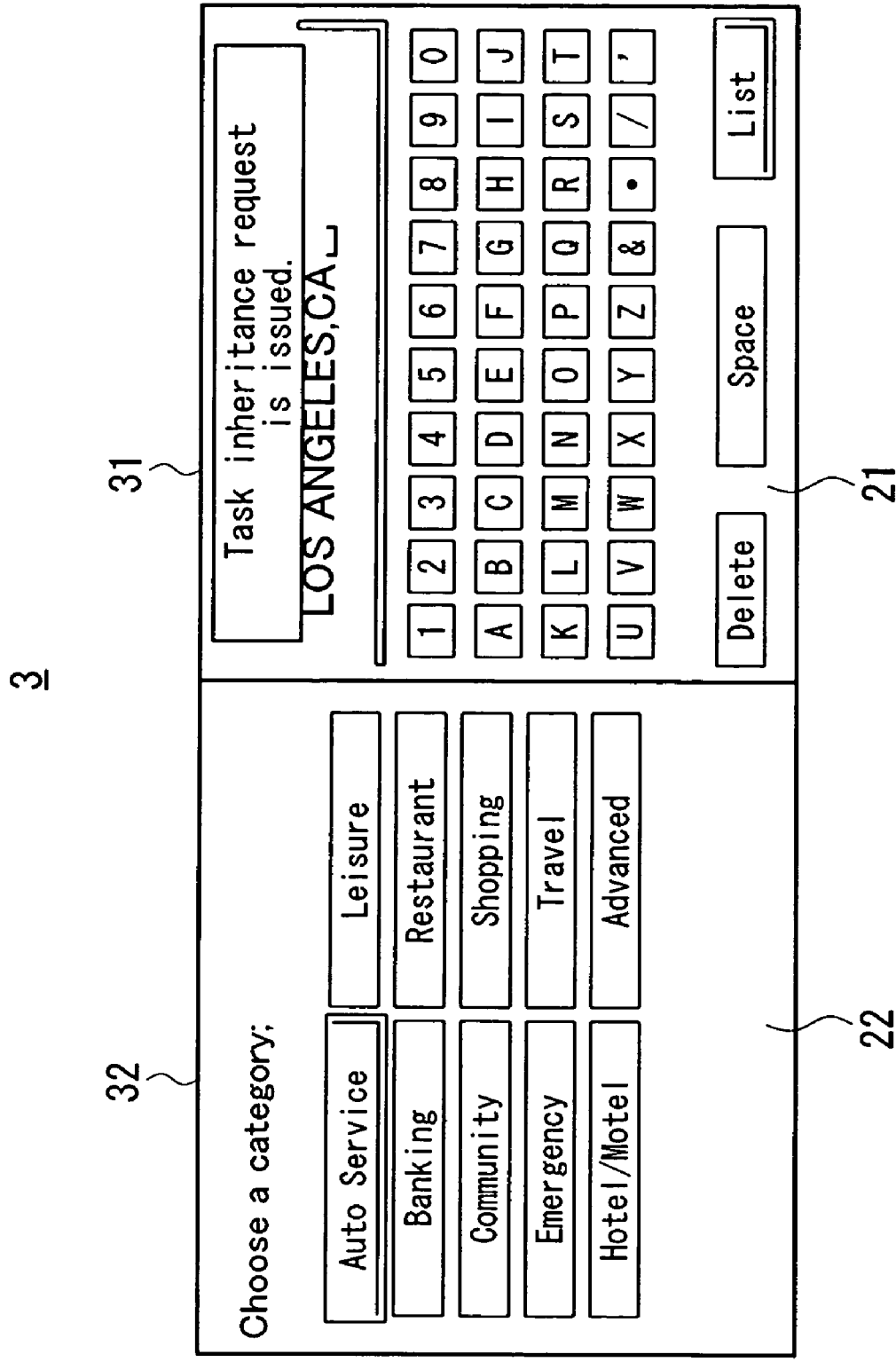
FIG. 8 is a diagram showing another example of the display screen of the display device of FIG. 2 showing a message confirming a task handover request.

FIG. 6 is a flowchart of the task handover process performed by the driver's seat processing section 11 of the processing device 1. FIGS. 7 and 8 show examples of the display screen of the display device 3.

In the first step S21 of FIG. 6, the task content changing device 13 makes the driver's seat processing section 11 execute a task handover input process for the task handover to the front passenger's seat side. Specifically, if an input operation for the driver's seat processing section 11 is interrupted for a specific period of time, the driver's seat processing section 11 makes the driver's seat display section 31 show a "Handover" operation button (see FIG. 7) for allowing the occupant in the driver's seat to input a task handover request, and waits for this occupant to input the task handover request.

When the occupant in the driver's seat inputs a task handover request by operating the displayed "Handover" operation button, the driver's seat processing section 11 outputs a task inheritance command by way of the task content changing device 13 to the front passenger's seat processing section 12 (see step S22).

The task content changing device 13 makes the driver's seat processing section 11 execute a task handover output process for the handover to the front passenger's seat side (see step S23). Specifically, the driver's seat processing section 11 makes the driver's seat display section 31 show a message indicating the output of a task inheritance request to the front passenger's seat processing section 12 (see FIG. 8) so as to inform the occupant in the driver's seat that the executing task is going to be handed from the driver's seat processing section 11 to the front passenger's seat processing section 12. When the running task is handed over from the driver's seat processing section 11 to the front passenger's seat processing section 12, the driver's seat processing section 11 terminates the task. If the occupant in the driver's seat does not request the task handover, the driver's seat processing section 11 terminates the task after a specific period of time.

Operation of the Front Passenger's Seat Processing Section

Figure 9:
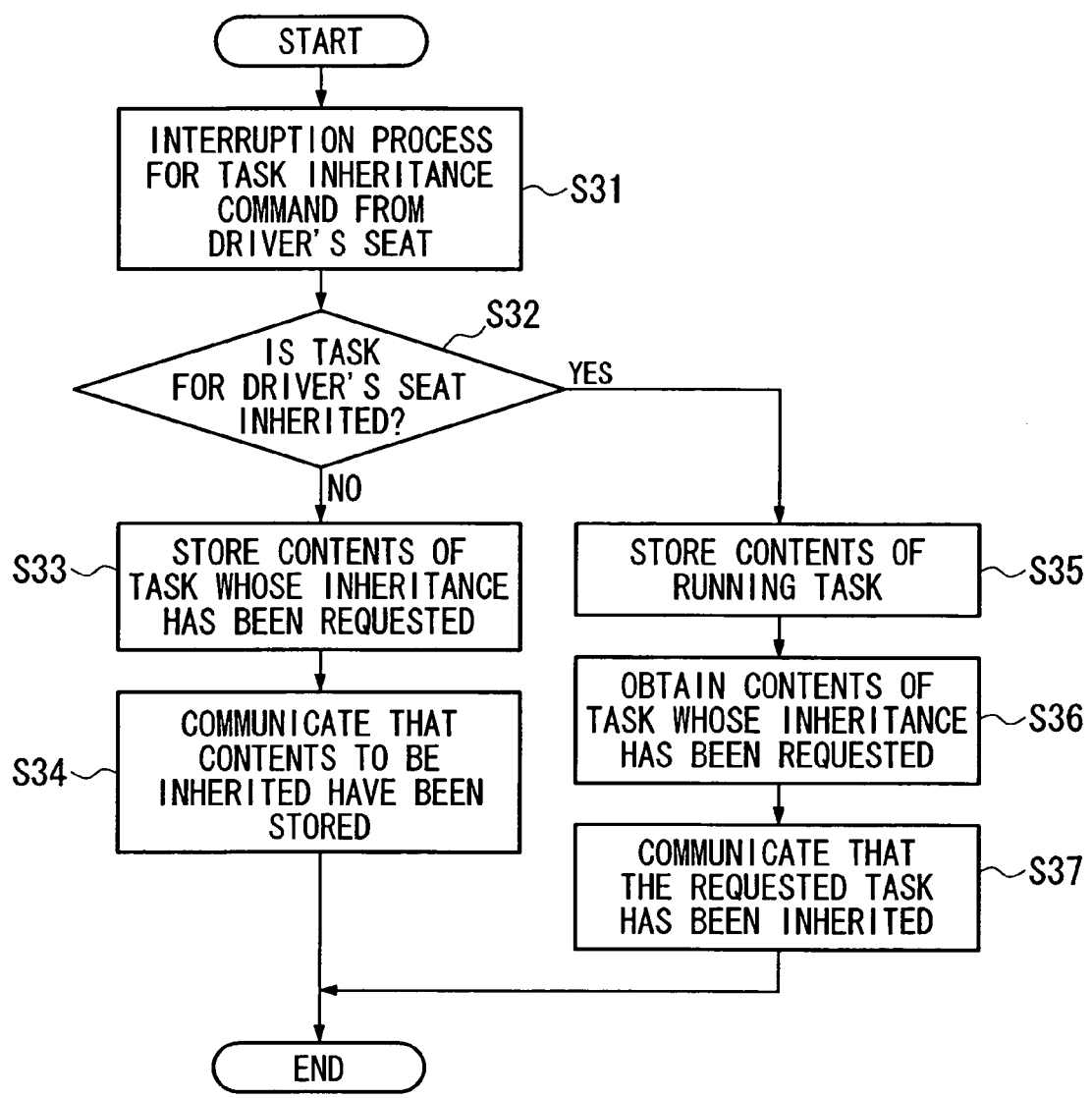
FIG. 9 is a flowchart showing the task handover operation performed by the front passenger's seat processing section in the processing device of the on-vehicle electronic control system in the embodiment.
Figure 10:
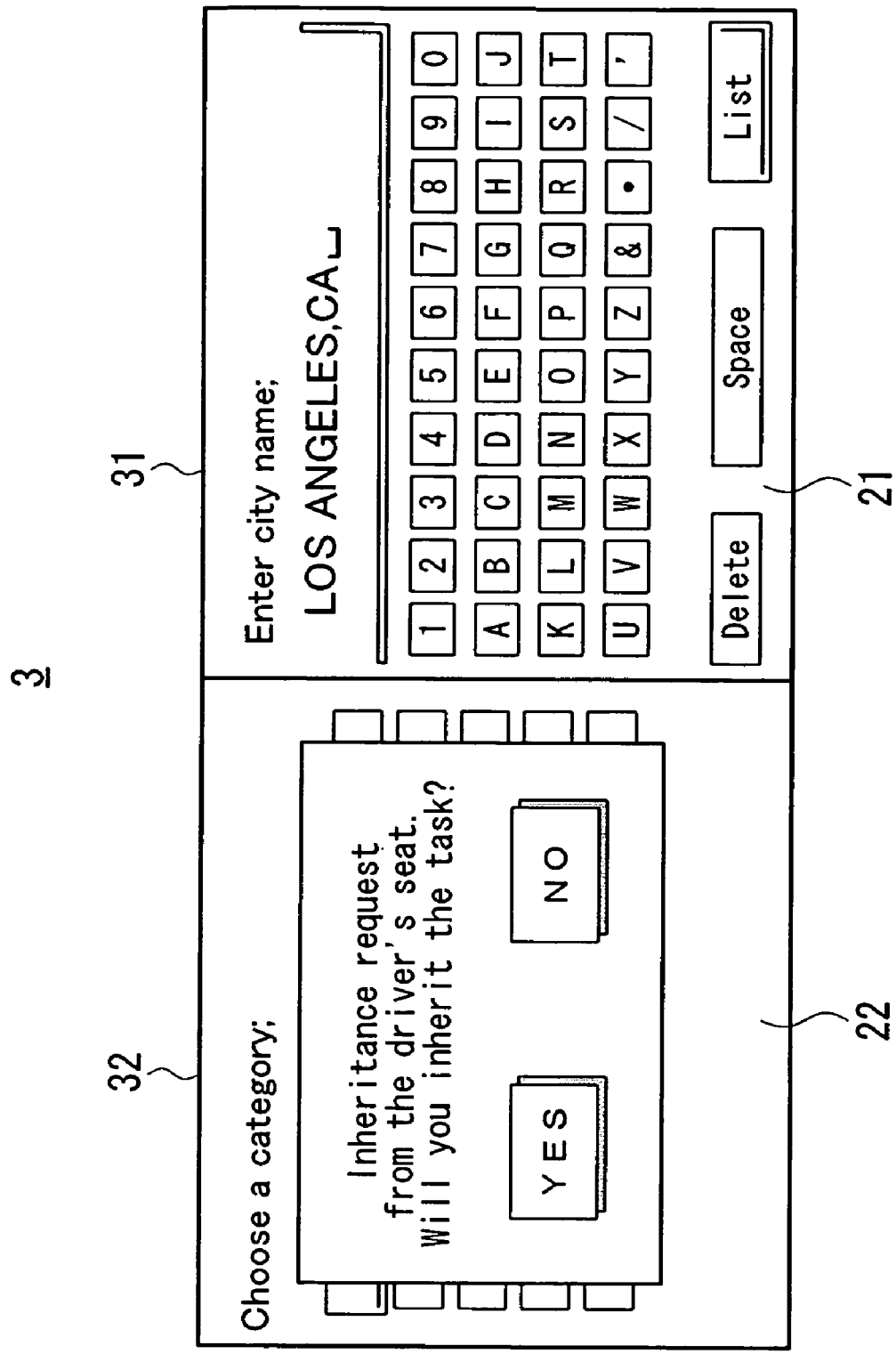
FIG. 10 is a diagram showing an example of the display screen of the display device of FIG. 2 of the on-vehicle electronic control system in the embodiment showing a query requesting confirmation of agreement to inherit the task.
Figure 12:
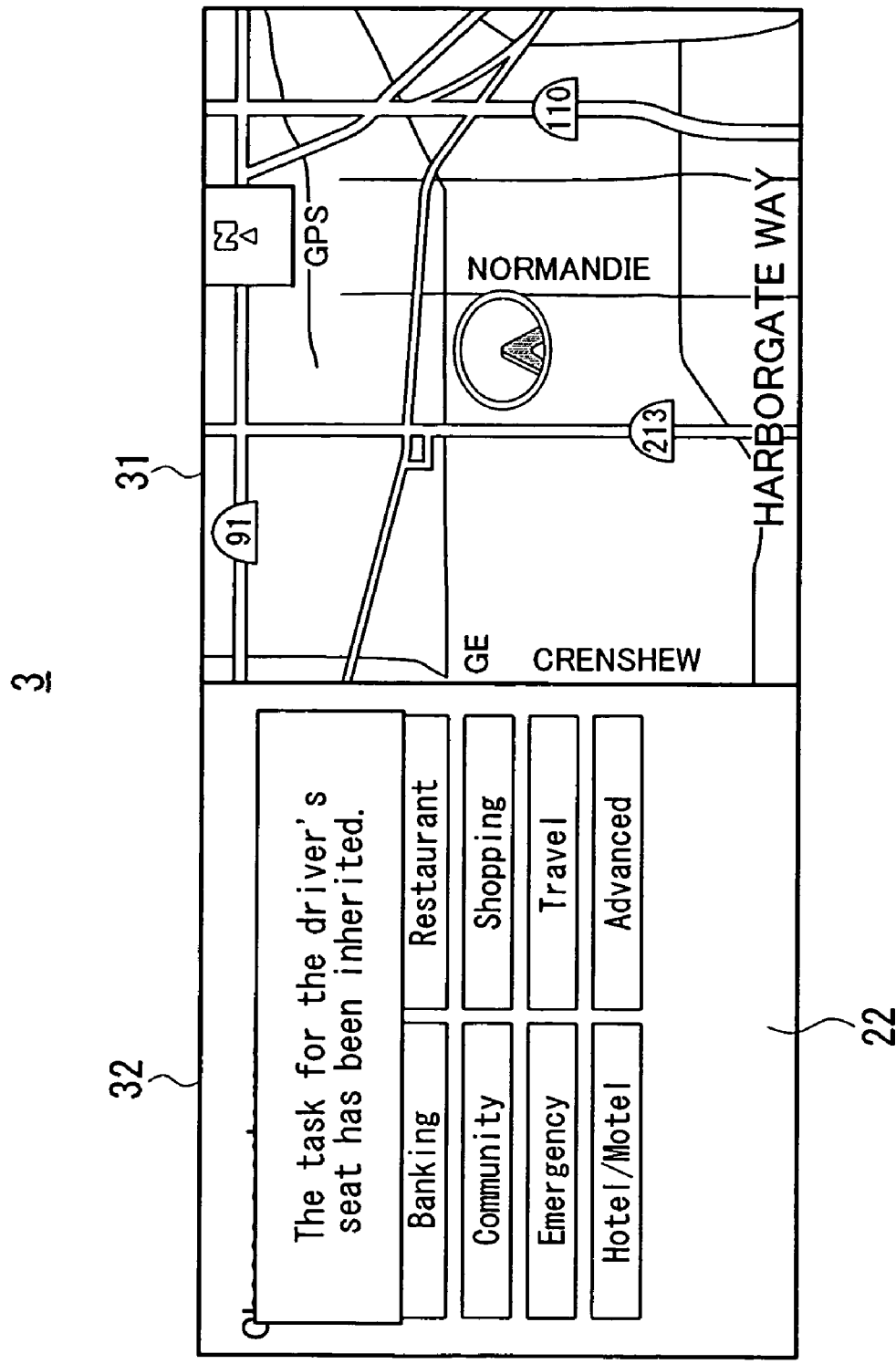
FIG. 12 is a diagram showing another example of the display screen of the display device showing a message indicating that the requested task has been inherited.

FIG. 9 is a flowchart showing the task handover operation performed by the front passenger's seat processing section 12 in the processing device 1. FIGS. 10 to 12 show examples of the display screen of the display device 3.

In FIG. 9, the task content changing device 13 makes the front passenger's seat processing section 12 execute an interruption process for a task inheritance command from the driver's seat (see step S3 1). Specifically, when the occupant in the driver's seat inputs a task handover request, the front passenger's seat processing section 12 may make the front passenger's seat display section 32 display the operation buttons "YES" and "NO" (see FIG. 10) for the occupant in the front passenger's seat to input whether the task handover is to be accepted and executed. Accordingly, the front passenger's seat processing section 12 waits for the occupant in the front passenger's seat to input a response (i.e., YES or NO) to the inquiry about the task handover.

When the occupant in the front passenger's seat inputs a response to the inquiry about the task handover by using one of the operation buttons displayed on the front passenger's seat display section 32, the task content changing device 13 makes the front passenger's seat processing section 12 confirm whether the task for the driver's seat is going to be inherited (see step S32). When the occupant in the front passenger's seat has no intention of inheriting the task for the driver's seat (i.e., "NO" in step S32), the task content changing device 13 makes the front passenger's seat processing section 12 execute a task storing process. Specifically, the front passenger's seat processing section 12 stores the contents of the task whose inheritance has been requested by the driver's seat processing section 11 (see step S33) and simultaneously makes front passenger's seat display section 32 display a message for indicating that the contents of the requested task have been stored (see FIG. 11), so as to inform the occupant in the front passenger's seat that the contents of the task whose inheritance was requested have been stored (see step S34).

In the above step S32, when the occupant in the front passenger's seat agrees to inherit the task produced for the driver's seat (i.e., "YES" in step S32), the task content changing device 13 makes the front passenger's seat processing section 12 execute a task inheriting process. Specifically, the front passenger's seat processing section 12 stores the contents of a task which the front passenger's seat processing section 12 is presently executing (see step S35) and then obtains the contents of the task, whose inheritance is requested from the driver's seat processing section 11, by way of the task content changing device 13 (see step S36). The front passenger's seat processing section 12 simultaneously makes the front passenger's seat display section 32 display a message for indicating that the requested task has been inherited (see FIG. 12), so as to inform the occupant in the front passenger's seat that the contents of the task whose inheritance was requested have been inherited by the front passenger's seat processing section 12 (see step S37).

In the present embodiment, input operations relating to the task handover are performed using a touch panel; however, any variations, such as voice input, may be employed.

Task Handover Process Between Operators During Voice Input Operations

Figure 13:
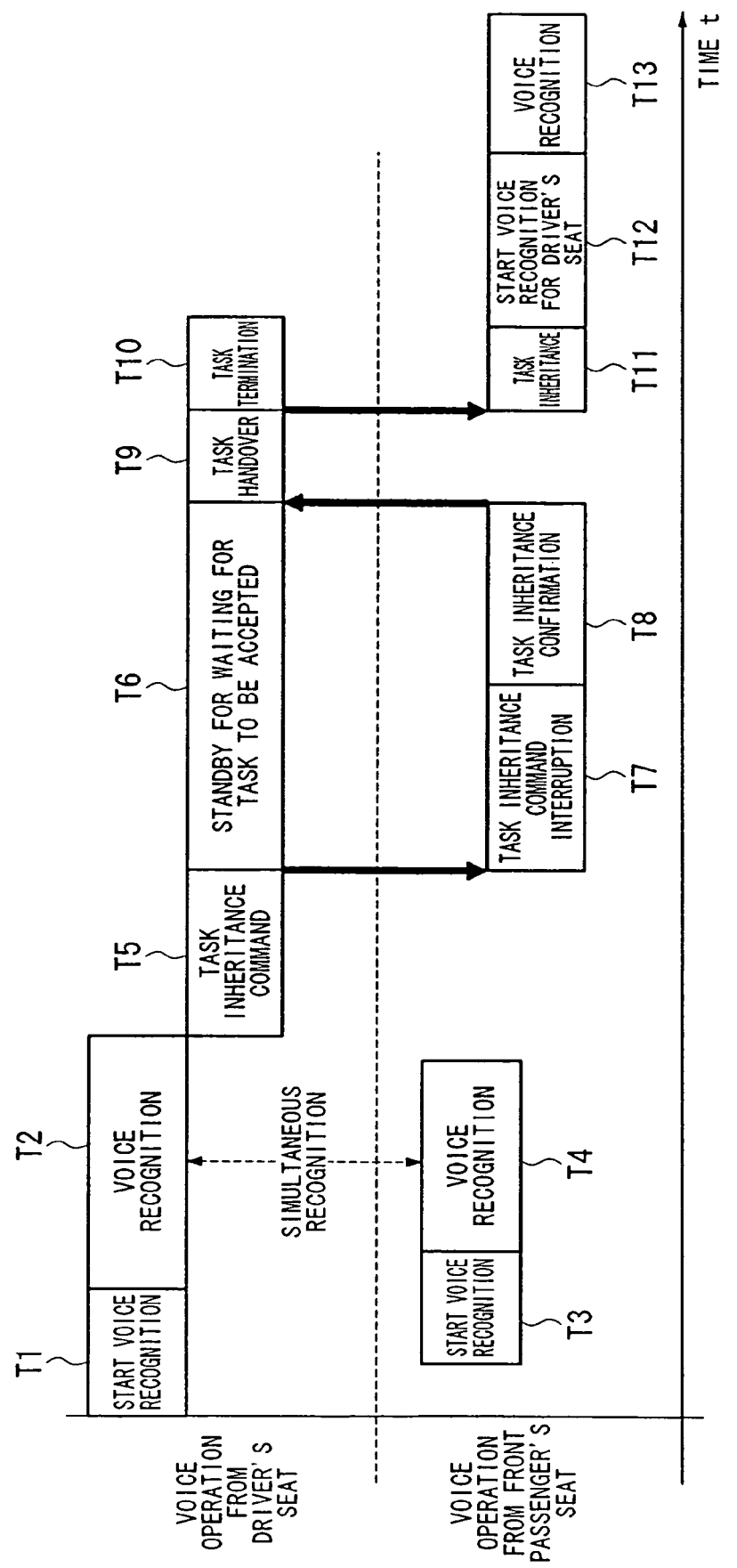
FIG. 13 is a timing chart showing the task handover process between the operators during the voice input operations in the on-vehicle electronic control system in the embodiment.

Next, another task handover process between the operators will be explained, which is performed for handing over a task assigned to any one of a plurality of voice input operations (i.e., voice-operated input) and executing it as a task assigned to another input operation. For convenience of explanation, the following explanation is also for a case in which a task is handed over from the driver's seat processing section 11 by way of the task content changing device 13 to the front passenger's seat processing section 12. FIG. 13 is a timing chart showing the task handover process between the operators during the voice input operations.

In FIG. 13, voice recognition for a voice input operation from the driver's seat is started by the driver's seat processing section 11 (see step T1), and during the voice recognition (see step T2), voice recognition for a voice input operation from the front passenger's seat is started by the front passenger's seat processing section 12 (see step T3). While the voice recognition by the driver's seat processing section 11 and the voice recognition by the front passenger's seat processing section 12 (see step T4) are simultaneously being executed, if the occupant in the driver's seat requests a task handover, the driver's seat processing section 11 outputs a task inheritance command by way of the task content changing device 13 to the front passenger's seat processing section 12 (see step T5). The task content changing device 13 makes the driver's seat processing section 11 standby, waiting for the task to be accepted (i.e., inherited) (see step T6).

On the other hand, the task content changing device 13 makes the front passenger's seat processing section 12 execute an interruption process for the task inheritance command from the driver's seat (see step T7). The task content changing device 13 also makes the front passenger's seat processing section 12 execute the process of confirming whether the task for the driver's seat is inherited (see step T8).

When the occupant in the front passenger's seat intends to inherit the task for the driver's seat, the task content changing device 13 makes the driver's seat processing section 11 execute the task handover process (see step T9). Accordingly, the driver's seat processing section 11 terminates the task (see step T10). The task content changing device 13 also makes the front passenger's seat processing section 12 execute the task inheriting process (see step T11) and start voice recognition for the voice input operation from the driver's seat (see step T12). After that, the front passenger's seat processing section 12 executes the relevant task in accordance with the voice operation from the driver's seat (see step T13).

In the above embodiment, the voice output section 42 is not limited to a speaker array, and may be independent speakers which are respectively provided in the vicinities of the driver's and front passenger's seats. In addition, for convenience of explanation, an example of processing the input operations by the occupants in the driver's and front passenger's seats is given; however, the number of occupants of the vehicle is not limited. If input operations by three or more occupants are processed, the number of processing sections in the processing device 1 and the number of mechanical input sections in the input device 2 are increased, and the number of control operations for directivity of the microphone array in the voice input section 23 and the number of control operations for directivity of the speaker array in the voice output section 42 are increased.

As explained above, the on-vehicle electronic control system in the present embodiment has (i) the driver's seat input section 21 and the front passenger's seat input section 22 for allowing the occupants in the driver's and the front passenger's seats to perform mechanical input operations, (ii) the voice input section 23 for distinguishably obtaining the voices of the occupants in the driver's and the front passenger's seats, so as to allow the occupants to independently perform voice input operations, (iii) the driver's seat display section 31 and the front passenger's seat display section 32 for independently showing processed results (i.e., results of the tasks) for the respective input operations from the occupants in the driver's and the front passenger's seats, (iv) the voice processing section 41 for independently producing voice outputs for the processed results for the respective input operations from the occupants in the driver's and the front passenger's seats by employing different kinds of voices, and (v) the voice output section 42 for respectively outputting the voice outputs toward the occupants in the driver's and the front passenger's seats. The on-vehicle electronic control system also includes the driver's seat processing section 11 and the front passenger's seat processing section 12 for independently processing the input operations by the occupants in the driver's and the front passenger's seats. When the input operation from one of the seats is interrupted, the intentions of the occupants (i.e., the operators) are confirmed by way of the task content changing device 13, and the relevant task can be inherited and executed by the processing section for the other seat.

Therefore, two independent manual and mechanical input operations, input using the driver's seat input section 21 and the front passenger's seat input section 22, are independently processed by the driver's seat processing section 11 and the front passenger's seat processing section 12, and the independently-processed results are respectively shown in the driver's seat display section 31 and the front passenger's seat display section 32. Accordingly, it is possible to simultaneously process the input operations from the occupants in the driver's and the front passenger's seats and to simultaneously display the respective processed results. In addition, the voice input section 23 has a microphone array for simultaneously performing a plurality of voice input operations, thereby simultaneously processing two independent voice input operations from the occupants in the driver's and the front passenger's seats and simultaneously showing the respective processed results.

Accordingly, a plurality of users do not have to wait for their turn for input operations, and can freely perform input operations. In addition, a plurality of tasks can be simultaneously handled; thus, for example, results for input operations or data under different conditions can be easily compared with each other. Therefore, output of the on-vehicle electronic control system in the present embodiment can be effectively used. In addition, the driver's seat display section 31 and the front passenger's seat display section 32 are divided display sections on a single display device; thus, a plurality of display devices are unnecessary, thereby reducing the number of necessary parts and thus reducing the cost relating to the parts and the manufacturing cost.

In addition, a task assigned to any one of a plurality of input operations can be handed over by the task content changing device 13 and executed as a task assigned to another input operation. Therefore, even when one of the input operations by the occupants in the driver's and the front passenger's seats is interrupted, the task relating to the interrupted operations can be inherited and executed as a task related to the input operation by the other occupant. More specifically, even when the occupant in the driver's seat starts driving the vehicle while performing the input operation, and thus cannot continue the input operation, the occupant in the front passenger's seat can inherit the relevant input operation, and the processed result with respect to the inherited input operation can be displayed on the driver's seat display section 31. Therefore, tasks for a plurality of input operations can be flexibly executed in consideration of the situation, thereby improving operational convenience for the occupants.

In addition, the voice processing section 41 produces different output voices having unique voice characteristics or tone qualities, for respective processed results corresponding to the respective input operations by the occupants in the driver's and the front passenger's seats, and the voice output section 42 outputs the output voices toward these occupants by using a speaker array. Therefore, it is possible to make the occupants in the driver's and the front passenger's seats accurately recognize the processed results as output voices.

Therefore, even when the occupants in the driver's and the front passenger's seats simultaneously performs input operations, it is possible to prevent each occupant from hearing the relevant processed results incorrectly, thereby allowing each occupant to appropriately continue the input operation and improving operational convenience for the occupants.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic control system built into a vehicle, the system comprising:
   an input device for receiving a plurality of manual input operations, wherein the input operations can be simultaneously and independently input by an occupant of a driver's seat and an occupant of a passenger's seat;
   a processing device for independently processing each of the plurality of input operations and outputting respective processed results corresponding to each of the plurality of input operations; and
   a display device for independently showing the respective processed results;
   wherein the processing device assigns a task to any one of the input operations;
   the processing device comprises:
   a task content changing device for making the task be inherited and executed as a task assigned to another input operation; and
   an input operation interruption determining device for determining whether any one of the input operations has been interrupted; and
   wherein when it is determined by the input operation interruption determining device that any one of the input operations has been interrupted, the task content changing device makes the task assigned to the interrupted input operation be inherited and executed as a task assigned to another input operation.

2. The electronic control system as claimed in claim 1, wherein the display device has a single display screen which is divided into a plurality of display sections for simultaneously and independently showing the respective processed results.

3. The electronic control system as claimed in claim 1, wherein the input device comprises a microphone array including a plurality of microphones, wherein the microphone array permits simultaneous and independent reception of a plurality of voice input operations.

4. The electronic control system as claimed in claim 1, further comprising:
   a voice output device for making the respective processed results be subjected to different processes in accordance with the independent input operations, so as to independently and vocally output the processed results by different voices having different tone qualities or different volumes.

5. The electronic control system as claimed in claim 4, wherein the voice output device has a speaker array including a plurality of speakers, and applies directivity to each processed result in accordance with the corresponding input operation by using the speaker array so as to output the processed results as voices having respective directivities.

6. The electronic control system as claimed in claim 4, wherein:
   the task content changing device includes a task handover request detecting device for detecting a task handover request from the occupant of the driver's seat; and
   when the task handover request is detected by the task handover request detecting device, the task assigned to the input operation whose interruption has been determined by the input operation interruption determining device is made to be inherited and executed as a task assigned to another input operation input by the occupant of the passenger's seat.

7. The electronic control system as claimed in claim 6, wherein:
   the task content changing device includes a task handover approval detecting device for detecting an approval of the occupant of the passenger's seat to a task handover from the occupant of the driver's seat; and
   when the approval of the task handover is detected by the task handover approval detecting device, the task assigned to the input operation whose interruption has been determined by the input operation interruption determining device is made to be inherited and executed as a task assigned to another input operation input by the occupant of the passenger's seat.

8. The electronic control system as claimed in claim 4, wherein the input operation interruption determining device determines that any one of the input operations has been interrupted when the input operation has been interrupted for a predetermined period of time or longer.

9. The electronic control system as claimed in claim 1, wherein the input device comprises a microphone array including a plurality of microphones, and wherein the microphone array permits simultaneous reception of a plurality of voice input operations, and distinguishes between each of the plurality of voice input operations using a geometric calculation based on the relative delay in receiving a given voice input operation for each microphone of the plurality of microphones.

10. The electronic control system as claimed in claim 1, wherein:
the task content changing device includes a task handover request detecting device for detecting a task handover request from the occupant of the driver's seat; and
when the task handover request is detected by the task handover request detecting device, the task assigned to the input operation whose interruption has been determined by the input operation interruption determining device is made to be inherited and executed as a task assigned to another input operation input by the occupant of the passenger's seat.

11. The electronic control system as claimed in claim 10, wherein:
the task content changing device includes a task handover approval detecting device for detecting an approval of the occupant of the passenger's seat to a task handover from the occupant of the driver's seat; and
when the approval of the task handover is detected by the task handover approval detecting device, the task assigned to the input operation whose interruption has been determined by the input operation interruption determining device is made to be inherited and executed as a task assigned to another input operation input by the occupant of the passenger's seat.

12. The electronic control system as claimed in claim 1, wherein the input operation interruption determining device determines that any one of the input operations has been interrupted when the input operation has been interrupted for a predetermined period of time or longer.

13. An electronic control system built into a vehicle, the system comprising:
a single input device for receiving a plurality of input operations, wherein the input operations can be simultaneously and independently input by an occupant of a driver's seat and an occupant of a passenger's seat;
a processing device comprising plural processing sections for simultaneously and independently processing each of the plurality of input operations, and outputting respective processed results corresponding to each of the plurality of input operations; and
a display device for independently showing the respective processed results;
wherein the processing device assigns a task to any one of the input operations;
the processing device comprises:
a task content changing device for making the task be inherited and executed as a task assigned to another input operation; and
an input operation interruption determining device for determining whether any one of the input operations has been interrupted; and
wherein when it is determined by the input operation interruption determining device that any one of the input operations has been interrupted, the task content changing device makes the task assigned to the interrupted input operation be inherited and executed as a task assigned to another input operation.

14. The electronic control system as claimed in claim 13, wherein the input device comprises a microphone array including a plurality of microphones, wherein the microphone array permits simultaneous and independent reception of a plurality of voice input operations, and distinguishes between individual voice input operations.

15. The electronic control system as claimed in claim 13, further comprising:
a voice output device for outputting the respective processed results so that each respective processed result is audibly identifiably distinct so as to be associated with the corresponding voice input operation, each respective processed result comprising a different voice having a different tone quality or different volume.

16. An electronic control system built into a vehicle, the system comprising:
an input device for receiving a plurality of manual input operations, wherein the input operations can be simultaneously and independently input by an occupant of a driver's seat and an occupant of a passenger's seat;
a processing device for simultaneously and independently processing each of the plurality of input operations and outputting respective processed results corresponding to each of the plurality of input operations; and
a display device for independently showing the respective processed results;
wherein the processing device assigns a task to any one of the input operations; the processing device comprises:
a task content changing device for making the task be inherited and executed as a task assigned to another input operation; and
an input operation interruption determining device for determining whether any one of the input operations has been interrupted; and
wherein when it is determined by the input operation interruption determining device that any one of the input operations has been interrupted, the task content changing device makes the task assigned to the interrupted input operation be inherited and executed as a task assigned to another input operation.

17. The electronic control system as claimed in claim 16, wherein the input device comprises a microphone array including a plurality of microphones, wherein the microphone array permits simultaneous and independent reception of a plurality of voice input operations.

18. The electronic control system as claimed in claim 16, wherein:
the task content changing device includes a task handover request detecting device for detecting a task handover request from the occupant of the driver's seat; and
when the task handover request is detected by the task handover request detecting device, the task assigned to the input operation whose interruption has been determined by the input operation interruption determining device is made to be inherited and executed as a task assigned to another input operation input by the occupant of the passenger's seat.

19. The electronic control system as claimed in claim 18, wherein:
the task content changing device includes a task handover approval detecting device for detecting an approval of the occupant of the passenger's seat to a task handover from the occupant of the driver's seat; and
when the approval of the task handover is detected by the task handover approval detecting device, the task assigned to the input operation whose interruption has been determined by the input operation interruption determining device is made to be inherited and executed as a task assigned to another input operation input by the occupant of the passenger's seat.

20. The electronic control system as claimed in claim 16, wherein the input operation interruption determining device determines that any one of the input operations has been interrupted when the input operation has been interrupted for a predetermined period of time or longer.

* * * * *